Nov. 15, 1966    W. WEZEL    3,285,136
PORTABLE GOUGING TOOL
Filed Feb. 16, 1965    2 Sheets-Sheet 1
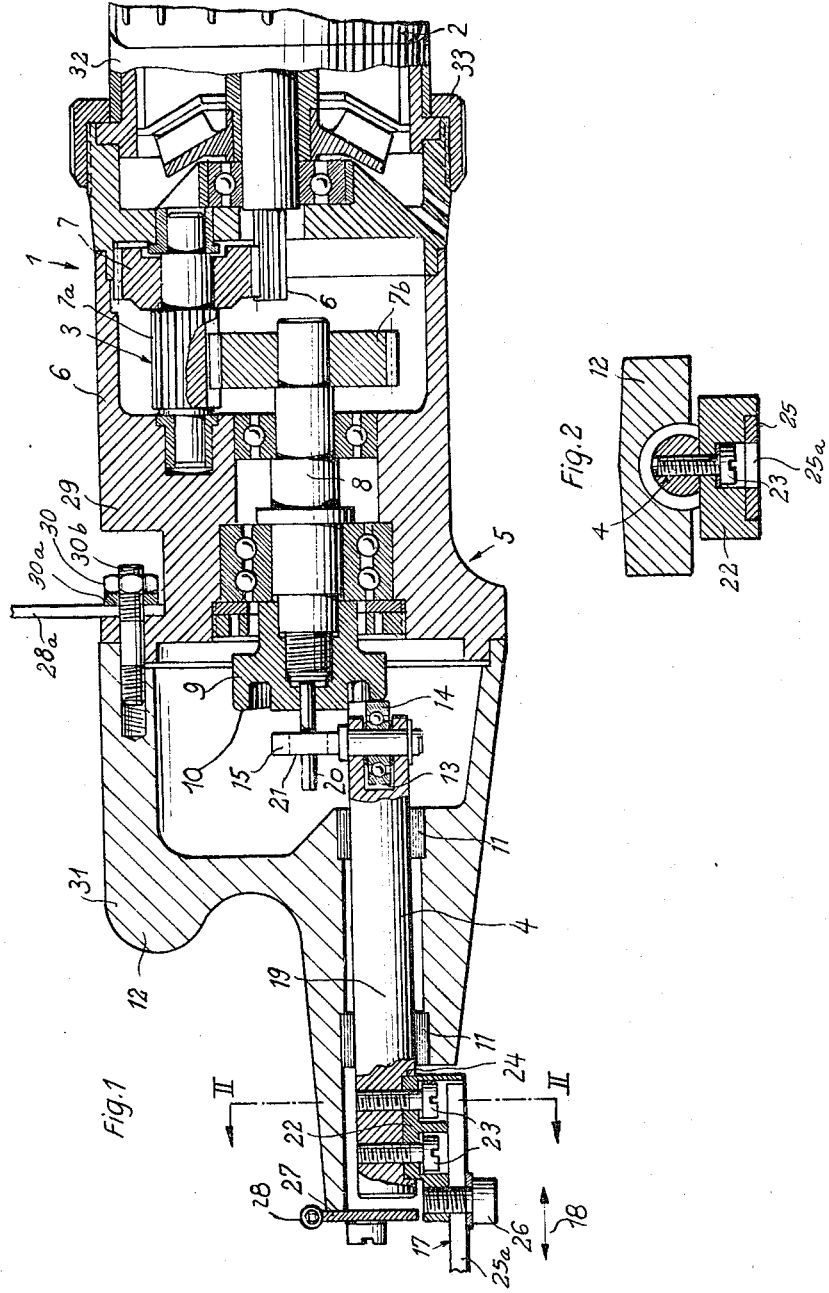
INVENTOR
WALTER WEZEL
BY Michael J. Striker
his ATTORNEY

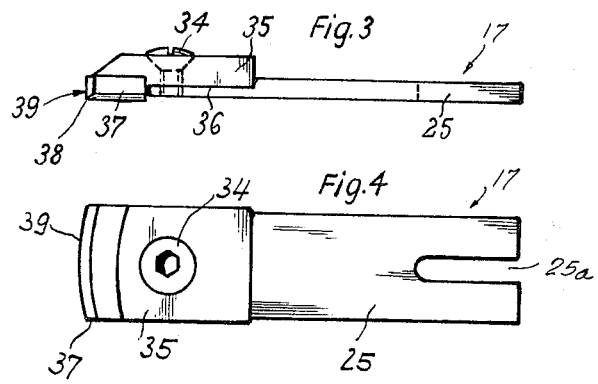
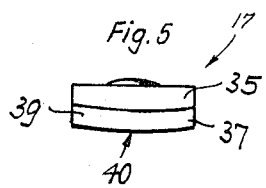
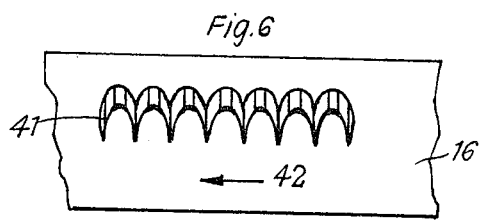

United States Patent Office 3,285,136
Patented Nov. 15, 1966

3,285,136
PORTABLE GOUGING TOOL
Walter Wezel, Maulbronn, Wurttemberg, Germany, assignor to Schmid & Wezel, Maulbronn, Wurttemberg, Germany
Filed Feb. 16, 1965, Ser. No. 433,024
Claims priority, application Germany, Feb. 21, 1964, Sch 35,428
16 Claims. (Cl. 90—24)

The present invention relates to portable tools in general, and more particularly to a portable power-driven gouging tool which may be utilized for so-called veining or carving in order to provide a smooth metallic surface with decorative or utilitarian grooves. Still more particularly, the invention relates to a power-driven tool which may be utilized with advantage to scoop out lubricant-containing grooves in the precision planed surface of a workpiece intended to slide with reference to a similarly finished part of a machine tool or the like.

It is well known to provide certain parts of machine tools with precision finished surfaces which are thereupon placed face-to-face with similarly finished parts to insure uniform distribution of stresses, proper lubrication and a minimum of wear. Such precision finish can be achieved by resorting to planing machines and is particularly desirable on surfaces of metallic parts which are not hardened so that they are more likely to undergo substantial wear in response to sliding engagement with cooperating parts. The manufacturer will use a planing machine when a non-hardened metallic workpiece is to be provided with such precision finished surfaces of exceptionally high smoothness which can retain a film of lubricant despite continuous or intermittent sliding engagement with other parts. Satisfactory lubrication is insured by forming such precision finished surface or surfaces with properly distributed oil grooves or pockets.

Manual planing is being rapidly replaced by machine planing and such machine planing is normally carried out by apparatus having one or more reciprocable tools which are quite satisfactory for normal planing operations. However, when a precision finished surface is to be provided with ornamental carvings which serve to improve the appearance and/or the lubricant-retaining characteristics of a smooth surface, conventional planing, chiseling, veining and carving tools cannot fully meet the requirements. Ornamental carving or gouging must improve the appearance of a finished surface simultaneously with improving the distribution of lubricant and of stresses which are transmitted to or by the thus treated surface. As a rule, an ornamental gouging operation must be carried out with utmost care to avoid a reduction in the precision finish of the treated surface or surfaces. There are a few exceptions, for example, certain types of woodworking machines wherein the appearance of surfaces is more important than their precision finish.

Accordingly, it is an important object of my present invention to provide a very simple, lightweight, comparatively inexpensive and easy-to-manipulate portable power driven gouging tool which may be utilized in carrying out ornamental carving or scooping operations on precision finished metallic surfaces within exceptionally short periods of time, with utmost precision and in such a way that the pockets or grooves formed in the treated surface consist of identically configurated portions.

Another object of the invention is to provide a portable power-driven tool of the just outlined characteristics which may be utilized to rapidly form sickle-shaped grooves (also called half-moon grooves) in precision finished surfaces of metallic parts to insure proper distribution and retention of lubricant when such surfaces slide with reference to similarly finished surfaces on slides, carriages, holders and other movable parts of machine tools or the like.

A further object of the invention is to provide a power-driven gouging tool whose cutter can be started or arrested while the motor of the tool is running so that the operator may place the cutter in an optimum position prior to start of the actual scooping or gouging operation and that such operation can be completed or interrupted at any time when the operator considers it necessary or desirable.

An additional object of the invention is to provide an improved gouge which may be utilized in a power-driven portable tool of the above outlined characteristics.

Still another object of the invention is to provide an improved transmission for my portable tool and to construct the transmission in such a way that the gouge will be set in motion in response to proper engagement with the surface to be treated.

A concomitant object of the invention is to provide a portable power-driven gouging tool which may be rapidly converted for the formation of differently dimensioned and/or configurated scoops and wherein the gouge may be detached from or connected to its drive mechanism with utmost accuracy and within exceptionally short periods of time.

A further object of the invention is to provide a tool of the above outlined type wherein the gouge will provide a precision planed surface with different types of ornamental grooves in response to changes in the speed at which the tool is moved over the surface.

Briefly stated, one feature of my invention resides in the provision of a portable gouging tool which comprises a housing provided with a motor, a drive shaft rotatably and axially movably mounted in the housing, a gouge secured to the drive shaft and having an arcuate cutting edge located externally of the housing, and a transmission operatively connected with the motor and with the shaft for intermittently moving the shaft in one axial direction and for simultaneously oscillating the shaft about its axis when the motor is running. When the motor is running and the cutting edge of the gouge is pressed against the surface to be treated with a pressure which suffices to move the drive shaft in the other axial direction between intermittent movements in one axial direction, the shaft reciprocates and oscillates to cause similar movements of the gouge.

In accordance with another important feature of my invention, the gouge preferably comprises a shank which is detachably coupled to the drive shaft, a holder which is detachably connected to the front end portion of the shank, and a cutter which is rigid with the holder. This cutter comprises a concave front face of cylindrical outline and a second concave face of cylindrical outline. The two faces intersect each other along the aforementioned cutting edge. A cutter of such configuration is capable of providing a precision planed surface with a groove consisting of a series of sickle-shaped portions serving as an adornment for the surface and/or as pockets for lubricant.

The novel features which are considered as characteristic of the invention are set forth in particular in the appended claims. The improved gouging tool itself, however, both as to its construction and its mode of operation, together with additional features and advantages thereof, will be best understood upon perusal of the following detailed description of a specific embodiment with reference to the accompanying drawings, in which:

FIG. 1 is a central section through a power-driven portable gouging tool which is constructed in accordance with my invention, portions of the motor and of the gouge being broken away;

FIG. 2 is a transverse vertical section as seen in the direction of arrows from the line II—II of FIG. 1 and illustrates the coupling between the gouge and the drive shaft;

FIG. 3 is a side elevational view of the gouge;

FIG. 4 is a top plan view of the gouge;

FIG. 5 is a front elevational view of the gouge as seen from the left-hand side of FIG. 4 or 5; and FIG. 6 is a fragmentary top plan view of a metallic workpiece whose surface has been treated by the gouge of FIGS. 3 to 5.

Referring to FIG. 1, there is shown a portable power-driven gouging tool 1 which comprises a driving unit composed of a motor 2, a transmission 3, a drive shaft 4 and a multi-section housing 5. The motor 2 may be an electric motor or a pneumatic motor and comprises an output shaft 6 which is toothed to mesh with a gear 7 forming part of the transmission 3. The gear 7 is rigid with a pinion 7a which meshes with a gear 7b mounted on an intermediate shaft 8. The front end portion of the shaft 8 carries a coaxial cylindrical face cam 9 having an inclined cam face 10 which is tracked by a roller follower 14 mounted on the rear end portion of the drive shaft 4. This drive shaft is parallel to but not coaxial with the intermediate shaft 8, and is mounted in antifriction bearings 11 provided in the front section 12 of the housing 5. The shaft 4 is reciprocable in response to rotation of the cam 9. The follower 14 constitutes the outer race of an antifriction bearing which is partially accommodated in a recess 13 provided in the rear end portion of the drive shaft 4 and is mounted on a pivot 15 whose axis is normal to the axes of the shafts 8 and 4. The pivot 15 comprises an extension which constitutes a lever and extends in front of the axis of the shaft 8. The face 10 of the cam 9 is inclined with reference to a plane which is normal to the axis of the shaft 8 so that, when the motor 2 is started to drive the shaft 8 and cam 9, the follower 14 will compel the drive shaft 4 to move forwardly, i.e., to perform a single working stroke. In the absence of a pressure in the opposite direction, the drive shaft 4 then remains in its forward end position and will not reciprocate unless the operator presses the gouge against the surface to be treated to thereby hold the follower 14 in contact with the cam face 10. In other words, the shaft 4 will reciprocate only in response to engagement of the gouge with the work and in response to such pressure which tends to effect a relative movement between the shaft 4 and housing 5 in a sense to move the shaft 4 rearwardly, namely, toward the cam 9. The gouge 17 is mounetd on the forward (left-hand) end portion of the drive shaft 4, and the workpiece 16 is shown in FIG. 6. Such mode of operation insures that the workman can place the gouge 17 in requisite position with reference to the workpiece 16 without causing reciprocation of the gouge even though the motor 2 is running.

In addition to being reciprocable in the axial direction (arrow 18), the gouge 17 receives a second type of motion which consists of an oscillatory (back and forth) movement about the axis 19 of the shaft 4. Such oscillatory movement is transmitted by a pin 20 which is parallel but eccentric with reference to the intermediate shaft 8 and extends beyond the cam face 10. The pin 20 is received in an elongated slot 21 provided in the lever-like extension of the pivot 15. When the shaft 8 rotates, the pin 20 is compelled to orbit about the axis of the cam 9 and causes the shaft 4 to swing back and forth about its axis 19. Such oscillatory movement of the shaft 4 will take place as soon and as long as the motor 2 is running regardless of whether the shaft 4 reciprocates in response to engagement of its follower 14 with the face 10 of the cam 9.

The forward end portion of the drive shaft 4 is provided with a coupling which serves to hold the gouge 17. This coupling comprises a first coupling member 22 which is attached to the shaft 4 by screws 23 or by similar fasteners. As shown, the periphery of the shaft 4 is provided with a cutout 24 to receive the base of the coupling member 22 which latter is located exernally of the front housing section 12, see FIGS. 1 and 2. The coupling member 22 has an underside provided with a recess which accommodates the shank 25 of the gouge 17 in such a way that the shank is surrounded from three sides so that a single locking screw 26 suffices to hold the gouge in the position of FIG. 1 or 2. The screw 26 extends through a hole in the shank 25 and into a tapped bore of the coupling member 22. Thus, the screw 26 constitutes the male coupling member of the aforementioned coupling and allows for rapid detachment of the shank 25. The forward end portion of the housing section 12 carries a stop plate 27 which is located in front of the drive shaft 4 and determines the maximum forward stroke of the gouge 17. The stop plate 27 also carries an eye 28 for the front end of a flexible member here shown as a belt 28a whose rear end is attached to the median housing section 29 at a level above the cam 9. In the illustrated embodiment, the rear end of the belt 28a is clamped between a shoulder of the housing section 29 and a washer 30a which is held in position by a nut meshing with a bolt 30b. The front housing section 12 defines a knob 31 which is grasped by the fingers of one hand while the same hand also holds the belt 28a. The rear section 32 of the housing 5 is connected with the motor 2 and is detachably coupled with the median section 29 by a nut 33.

The exact configuration of my improved gouge 17 is illustrated in FIGS. 3 to 5. The shank 25 is a flat plate having a rear end portion provided with a forwardly extending slot 25a so that it may be slipped around the stem of the screw 26 even if the latter remains attached to the coupling member 22. The forward end portion of the shank 25 is of reduced thickness (as at 36) and is detachably connected with a holder 35 by means of a screw 34 or a similar fastener. The holder 35 carries the actual cutter 37 which may be welded or otherwise rigidly affixed to the holder. The cutting edge 38 is of arcuate shape and is located at the intersection of two convex faces 39, 40 of cylindrical outline. The face 40 is located at the underside of the cutter 37 and the face 39 is located at the front side of the cutter. It will be noted that the two faces 39, 40 bulge outwardly. Their radii of curvature may but need not be the same. These faces should be precision polished and lapped to insure the formation of accurately defined grooves.

The ornamental groove 41 in the workpiece 16 of FIG. 6 consists of a row of sickle-shaped portions and is scooped out by moving the cutting edge 38 of the gauge 17 in the direction indicated by an arrow 42. Such a groove may be machined with a minimum of practice and with utmost accuracy by a workman who has never before manipulated the tool of FIG. 1. In accordance with conventional practice, a satisfactory groove can be formed by a workman after many years of training.

The exact dimensions of the sickle-shaped portions of the groove 41 in the precision planed surface of the workpiece 16 will depend on the width of the cutter 35, on the speed at which the operator moves the tool in the axial direction of the shaft 4, and on the curvature of the cutting edge 38, i.e., on the curvature of the front face 39 and second face 40. If the length of the forward stroke of the gouge 17 is to be changed, the cam 9 is replaced by a differently configurated cam having a cam face whose inclination is different from that of the cam face 10. However, it normally suffices to use the same cam for different types of ornamental carving.

Prior to forming the groove 41, the surface of the workpiece 16 should be subjected to preliminary treatment including planing in the longitudinal direction with a comparatively wide planing tool which is caused to perform long working strokes. During such rough planing, one need not be careful to insure the provision of a large number of supporting zones which are located in the same plane. Therefore, it suffices to use a tool with a large radius to insure rapid completion of the rough planing operation. Such tools are relatively wide and can make a wide cut. After repeated planing and touching up, the surface is ready to be formed with one or more grooves 41. Repeated planing and touching up is carried out by resorting to progressively narrower tools to insure that all portions of the surface are treated to a requisite degree of precision finish.

The groove 41 may serve a purely decorative purpose, or it may simultaneously serve as a depository for lubricant when the workpiece 16 is placed in sliding contact with another precision finished part and is caused to move relative to such part. For example, the workpiece 16 may constitute a slide in a machine tool or it may constitute the carriage for a slide so that its grooved surface must be lubricated at all times to prevent excessive wear and to allow for sliding movement in response to exertion of a small force.

The customary trigger (not shown) of the motor 2 will close an electric switch or opens a valve, depending upon whether the motor is driven by electric current or by compressed air.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In a portable gouging tool, a housing provided with a motor; a drive shaft rotatably and axially movably mounted in said housing; a gouge secured to said drive shaft and comprising a cutter located externally of said housing, said cutter having a cutting edge adapted to be pressed against a surface to be gouged and to thereby move said drive shaft in one axial direction; and transmission means operatively connected with said motor and with said shaft for oscillating said shaft about the axis thereof and for intermittently moving said shaft along said axis thereof in the other axial direction when the motor is running and the cutting edge of said gouge is pressed against a surface whereby said shaft reciprocates with the gouge.

2. In a portable gouging tool according to claim 1, said motor supported by said housing and having an output shaft said drive shaft being rotatably mounted in said housing in parallelism with said output shaft, and said transmission means comprising an intermediate shaft parallel and offset with reference to said drive shaft, a gear train drivingly coupling said intermediate shaft with said output shaft so that the intermediate shaft rotates when the motor is running, a pin eccentrically secured to said intermediate shaft and parallel with said drive shaft, and a lever rigid with and extending substantially radially with reference to said drive shaft, said lever having an elongated slot receiving said pin so that the drive shaft oscillates about its axis in response to rotation of said intermediate shaft.

3. In a portable gouging tool according to claim 1, said transmission means comprising a second shaft driven by said motor, said second shaft being parallel and laterally offset with reference to said drive shaft, a pin eccentrically secured to said second shaft and parallel with said drive shaft, and a lever rigid with and extending substantially radially from said drive shaft, said lever having an elongated slot receiving said pin.

4. In a portable gouging tool, a housing provided with a motor; a drive shaft rotatably and axially movably mounted in said housing; a gouge secured to said drive shaft and comprising a cutter located externally of said housing, said cutter having an arcuate cutting edge adapted to be pressed against a surface to be gouged and to thereby move said drive shaft in one axial direction; and transmission means operatively connected with said motor and with said shaft for oscillating said shaft about the axis thereof and for intermittently moving said shaft along said axis thereof in the other axial direction when the motor is running and the cutting edge of said gouge is pressed against a surface whereby said shaft reciprocates with the gouge, said transmission means comprising a second shaft driven by said motor and parallel with said drive shaft, a cam mounted on said second shaft, and a follower mounted on said drive shaft and engaging said cam in response to pressure transmitted to the drive shaft when said cutting edge is pressed against a surface to be treated.

5. A structure as set forth in claim 4, wherein said cam is provided with a cam face located in a plane making an angle other than 90 degrees with the axes of said shafts and said follower is a roller rotatably mounted on said drive shaft in the interior of said housing.

6. A structure as set forth in claim 5, wherein said drive shaft comprises a forward end portion and a rear end portion, said follower being mounted on the rear end portion of said drive shaft and said housing comprising stop means located in front of said forward end portion to limit the stroke of said drive shaft in said other direction when the cutting edge of said gouge is disengaged from the surface to be treated and while said motor is running.

7. A portable gouging tool, comprising a housing provided with a motor; a drive shaft rotatably and axially movably mounted in said housing; a gouge secured to said shaft and having an arcuate cutting edge located externally of said housing so as to be movable into engagement with a surface to be treated whereby the drive shaft is urged to move in one axial direction thereof; and transmission means operatively connected with said shaft and with said motor for intermittently moving said shaft in the other axial direction thereof when the motor is running whereby the shaft reciprocates in response to engagement between said cutting edge and the surface to be treated with a force which suffices to move the drive shaft in said one direction between intermittent movements in said other direction, said transmission means further comprising means for oscillating said drive shaft about the axis thereof when the motor is running.

8. A portable gouging tool, comprising a housing provided with a motor; a drive shaft rotatably and axially movably mounted in said housing; a gouge secured to said shaft and including a cutter located externally of said housing, said cutter having a convex front face of cylindrical outline and a second convex face of cylindrical outline, said faces intersecting each other along an arcuate cutting edge which is movable in engagement with a surface to be treated whereby the drive shaft is urged to move in one axial direction thereof; and transmission means operatively connected with said shaft and with said motor for intermittently moving said shaft in the other axial direction thereof when the motor is running whereby the shaft reciprocates in response to engagement between said cutting edge and the surface to be treated with a force which suffices to move the drive shaft in said one direction between intermittent movements in said other direction, said transmission means further comprising means for oscillating said drive shaft about the axis thereof when the motor is running.

9. A portable tool as set forth in claim 8, wherein said gouge further comprises a holder rigid with said cutter, a shank having a rear end portion coupled with said drive shaft and a front end portion, and fastener means detachably securing the front end portion of said shank to said holder.

10. A portable tool as set forth in claim 8, further comprising coupling means for detachably securing said gouge to said drive shaft, said coupling means comprising a first coupling member affixed to said drive shaft and having a recess arranged to accommodate a portion of said gouge, and a second coupling member threadedly engaging said first coupling member to retain the gouge in said recess.

11. A portable gouging tool, comprising a housing provided with a motor having an output shaft; a drive shaft rotatably and axially movably mounted in said housing; a gouge secured to said drive shaft and having a cutter located externally of said housing, said cutter having a convex front face of cylindrical outline and a second convex face of cylindrical outline, said faces intersecting each other along an arcuate cutting edge adapted to be placed against a surface to be gouged and to transmit to said drive shaft a pressure tending to move the drive shaft in one axial direction thereof; and transmission means comprising an intermediate shaft rotatably mounted in said housing in parallelism with said drive shaft, a driving connection between said output shaft and said intermediate shaft for rotating the intermediate shaft when the motor is running, a cam coaxially secured to said intermediate shaft and having a cam face located in a plane which makes with the axis of said drive shaft an angle other than 90 degrees, a follower rotatably mounted on said drive shaft and arranged to track said cam face when said cutting edge is pressed against the surface to be treated whereby the drive shaft reciprocates when the motor is running, a pin eccentrically secured to said intermediate shaft and extending in parallelism with said drive shaft, and a lever fixed to and extending substantially radially from said drive shaft, said lever having an elongated slot receiving said pin whereby the drive shaft oscillates about the axis thereof whenever said motor is running.

12. A portable gouging tool, comprising a housing provided with a motor having an output shaft; a drive shaft rotatably and axially movably mounted in said housing; a gouge secured to said drive shaft and having a cutter located externally of said housing, said cutter having a convex front face of cylindrical outline and a second convex face of cylindrical outline, said faces intersecting each other along an arcuate cutting edge adapted to be placed against a surface to be gouged and to transmit to said drive shaft a pressure tending to move the drive shaft in one axial direction thereof; transmission means comprising an intermediate shaft rotatably mounted in said housing in parallelism with said drive shaft, a driving connection between said output shaft and said intermediate shaft for rotating the intermediate shaft when the motor is running, a cam coaxially secured to said intermediate shaft and having a cam face located in a plane which makes with the axis of said drive shaft an angle other than 90 degrees, a follower rotatably mounted on said drive shaft and arranged to track said cam face when said cutting edge is pressed against the surface to be treated whereby the drive shaft reciprocates when the motor is running, a pin eccentrically secured to said intermediate shaft and extending in parallelism with said drive shaft, and a lever fixed to and extending substantially radially from said drive shaft, said lever having an elongated slot receiving said pin whereby the drive shaft oscillates about the axis thereof whenever said motor is running; a knob on said housing to provide a hold for the fingers of the user's hand; and a flexible member having ends secured to spaced portions of said housing, said flexible member being held by hand of the user to facilitate the manipulation of said tool.

13. A portable gouging tool, comprising a housing provided with a motor; a drive shaft rotatably and axially movably mounted in said housing for angular and reciprocating movement about a fixed axis coinciding with the axis of said shaft; a gouge secured to said shaft and having an arcuate cutting edge located externally of said housing so as to be movable into engagement with a surface to be treated; and transmission means located in said housing and operatively connected with said motor for reciprocating said shaft along said fixed axis and for simultaneously oscillating the shaft about said axis thereof.

14. A power-driven portable gouging tool, particularly for scooping out portions of precision finished metallic surfaces, comprising a housing; motor means mounted on said housing; a drive shaft rotatably and axially movably mounted on said housing; a gouge mounted on said shaft for movement therewith; and transmission means for oscillating and for simultaneously reciprocating said shaft, respectively, about and along the axis thereof when said motor is running and said gouge is pressed against the surface to be treated, said gouge comprising a cutter located externally of said housing and having a pair of convex faces of cylindrical outline intersecting each other along an arcuate cutting edge.

15. A tool according to claim 13 wherein said gouge comprises a shank having a rear end portion secured to said shaft and a front end portion; a holder adjacent to said front end portion; fastener means detachably securing said holder to said shank; and a cutter rigid with said holder, said cutter having a convex front face of cylindrical outline and a second convex face of cylindrical outline, said faces intersecting each other along said arcuate cutting edge.

16. A tool according to claim 13 comprising an elongated shank having a rear end portion secured to said shaft and a front end portion of reduced thickness provided with a tapped bore; a holder abutting against said front end portion and having a bore registering with said tapped bore; a threaded fastener extending through said bores and meshing with said front end portion to detachably secure said holder to said shank; and a cutter welded to said holder, said cutter having a convex front face of cylindrical outline and a second convex face of cylindrical outline, said faces intersecting each other along an arcuate cutting edge.

References Cited by the Examiner
UNITED STATES PATENTS

| | | | |
|---|---|---|---|
| 2,503,539 | 4/1950 | Aspeek | 30—169 X |
| 2,722,072 | 11/1955 | Aspeek | 30—169 |
| 3,078,572 | 2/1963 | Everton | 30—169 X |
| 3,147,548 | 9/1964 | Aspeek | 30—272 |

WILLIAM W. DYER, JR., *Primary Examiner.*

G. A. DOST, *Assistant Examiner.*